US007007661B2

(12) United States Patent
Warlick

(10) Patent No.: US 7,007,661 B2
(45) Date of Patent: Mar. 7, 2006

(54) METHOD AND APPARATUS FOR CONTROLLING MICRO PILOT FUEL INJECTION TO MINIMIZE $NO_X$ AND UHC EMISSIONS

(75) Inventor: Tim Warlick, Spanish Fort, AL (US)

(73) Assignee: Woodward Governor Company, Fort Collins, CO (US)

( * ) Notice: Subject to any disclaimer, the term of this patent is extended or adjusted under 35 U.S.C. 154(b) by 38 days.

(21) Appl. No.: 10/765,803

(22) Filed: Jan. 27, 2004

(65) Prior Publication Data

US 2005/0161017 A1    Jul. 28, 2005

(51) Int. Cl.
*F02M 7/00*    (2006.01)

(52) U.S. Cl. .................................................. 123/276 E
(58) Field of Classification Search ............ 123/276 E, 123/526, 525, 299, 27 R
See application file for complete search history.

(56) References Cited

U.S. PATENT DOCUMENTS

| | | | | |
|---|---|---|---|---|
| 4,817,568 | A | * | 4/1989 | Bedford ........................ 123/431 |
| 5,139,002 | A | * | 8/1992 | Lynch et al. .................. 123/575 |
| 5,140,959 | A | * | 8/1992 | Durbin ......................... 123/304 |
| 5,450,829 | A | | 9/1995 | Beck |
| 5,887,566 | A | * | 3/1999 | Glauber et al. ............... 123/275 |
| 6,178,927 | B1 | * | 1/2001 | Rieck et al. ................ 123/27 GE |
| 6,202,601 | B1 | * | 3/2001 | Ouellette et al. ........... 123/27 GE |
| 6,230,683 | B1 | * | 5/2001 | zur Loye et al. ............. 123/435 |
| 6,386,149 | B1 | * | 5/2002 | Coleman et al. ............. 123/25 C |
| 6,675,748 | B1 | * | 1/2004 | Ancimer et al. ............. 123/27 R |
| 6,814,032 | B1 | * | 11/2004 | Goto ....................... 123/27 GE |

OTHER PUBLICATIONS

Pierong Wu et al., "Fuel Economy and Operating Characteristics of a Hydropneumatic Energy Storage Automobile", SAE Technical Paper Series, Paper No. 851678, 1985, 12 pages.
Magnus Glavmo et al., "Closed Loop Start of Combustion Control Utilizing Ionization Sensing in a Diesel Engine", SAE Technical Paper Series, Paper No. 1999-01-0549, 1999, 12 pages.
S. Tollefson et al., "Studies of an Accumulator Energy-Storage Automobile Design with a Single Pump/Motor Unit", SAE Technical Paper Series, Paper No. 851677, 1985, 10 pages.
Delphi Automotive Systems, "Delphi Launches World's Most Advanced Common Rail Diesel System with Ford", Press Release, Feb. 28, 2001.

* cited by examiner

*Primary Examiner*—Henry C. Yuen
*Assistant Examiner*—Jason Benton
(74) *Attorney, Agent, or Firm*—Reinhart Boerner Van Deuren P.C.

(57) ABSTRACT

The present invention provides a system that controls the amount and timing of pilot fuel injection to obtain minimum $NO_x$ and UHC emissions. The system senses if combustion occurs, when combustion occurs, and/or the quality of combustion in the combustion chamber of each cylinder of the gaseous fuel engine and adjusts the amount and/or timing of the pilot fuel injected. The minimum amount of pilot fuel needed to ignite gaseous fuel in a combustion chamber is determined and injected into the prechamber or the combustion chamber of the engine. The actual start of combustion location is determined and the injection timing is adjusted if the start of combustion location is not approximately equal to a desired location. The amount of pilot fuel or injection timing is adjusted if a knock or a misfire has occurred or if the combustion quality measure is not approximately equal to a desired quality measure.

17 Claims, 2 Drawing Sheets

US 7,007,661 B2

METHOD AND APPARATUS FOR CONTROLLING MICRO PILOT FUEL INJECTION TO MINIMIZE NO$_x$ AND UHC EMISSIONS

FIELD OF THE INVENTION

The present invention relates generally to ignition engines, and more particularly relates to a method and apparatus for controlling the injection of pilot fuel into the combustion chambers of the engine.

BACKGROUND OF THE INVENTION

Natural gas and other gaseous fuels such as propane are considered by many to be superior to other fuels such as diesel fuel and the like for engines because the gaseous fuels are generally less expensive to operate, and produce significantly lower emissions. The overall performance of an engine in terms of combustion efficiency, speed control, and exhaust emissions, greatly depends on controlling the mixing of the air and fuel into an appropriate ratio for combustion and on regulating the flow of this mixture into the combustion chamber or cylinder of the engine. Precise and reliable control of the combustion is very important for the efficiency and the safety of the combustion process. For example, it is well known that excess fuel yields fast combustion rates and high combustion temperatures, which result in high nitrogen oxide (NO$_x$) emissions. Too little fuel can cause incomplete combustion, which results in high unburned hydrocarbon (UHC) emissions and loss of power.

One drawback of gaseous fuels is that they require an ignition source to begin the combustion process. Spark plugs are typically used to ignite the fuel in gaseous fueled engine combustion chambers. However, the use of spark plugs decreases the maintenance interval of the engine, which in turn leads to increased operating costs.

Several engine manufacturers have introduced, or are developing, micro pilot ignited natural gas engines. The advantages claimed and substantiated by test data include it being an adjustable high energy ignition system and having good combustion stability, good thermal efficiency, power densities equal to the diesel engine, and NO$_x$ levels about one tenth that of the diesel engine. A small pilot fuel injector, typically using diesel fuel, fuel oil, or even engine oil as the pilot fuel, is used and replaces the spark plug in the open chamber (or prechamber) of natural gas engines. Limited amounts of pilot fuel are injected into the combustion chamber (or pre-combustion chamber) to initiate combustion by compression ignition. The pilot fuel ignites and burns at a high enough temperature to ignite the gaseous fuel charge in the combustion chamber. The added complexity of having two fuel systems (e.g., pilot fuel and natural gas) is compensated for by lower operating costs. Because power density was limited by spark plug life, increases in power density, fuel efficiency, and increased time between scheduled maintenance are possible due to elimination of the spark plug as the combustion ignition device.

It is well known that the ignition characteristics of gaseous fuels vary with engine operating conditions. For instance, the air/fuel ratio and density in the combustion chamber, changing as a result of changes in engine load, affect the combustion characteristics of the charge in the combustion chamber. The optimum amount of pilot fuel required to successfully ignite the gas charge can vary depending on the engine combustion chamber design, the fuel temperature, the fuel quality, the air temperature, the air/fuel ratio in the combustion chamber, the residual exhaust in the chamber, the pilot fuel cetane number, and the pilot fuel spray characteristics. One approach to inject the pilot fuel is to always inject sufficient pilot fuel to assure adequate primary fuel charge ignition under all conditions. However, this approach is undesirable because the pilot fuel combustion produces higher NO$_x$ emissions (too fast combustion) and higher fuel consumption (rich fuel mixture). Too little pilot fuel injected can result in the mixture not igniting, which will cause a drop in horsepower output and an increase in unburned hydrocarbon (UHC) emissions.

BRIEF SUMMARY OF THE INVENTION

To obtain the lowest NO$_x$ emissions, the least amount of pilot fuel that will ignite the combustible natural gas mixture is needed. The present invention provides a control system that controls the amount and timing of pilot fuel injection, such as diesel fuel, to obtain minimum NO$_x$ and UHC emissions. The control system senses if combustion occurs, when combustion occurs, and/or the quality of combustion in the combustion chamber of each cylinder of the gaseous fuel engine and adjusts the amount and/or timing of the pilot fuel injected.

The minimum amount of pilot fuel needed to ignite gaseous fuel in a combustion chamber is determined and injected into the prechamber or the combustion chamber of the engine. The actual start of combustion location is determined from an ionization signal or from a cylinder pressure of the combustion chamber signal. The pilot fuel injection timing is also adjusted if the actual start of combustion location is not approximately equal to the desired start of combustion location.

The amount of pilot fuel or injection timing is adjusted if a knock or a misfire has occurred. The amount of pilot fuel injected is adjusted if the combustion quality measure is not approximately equal to a desired combustion quality measure.

Other advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
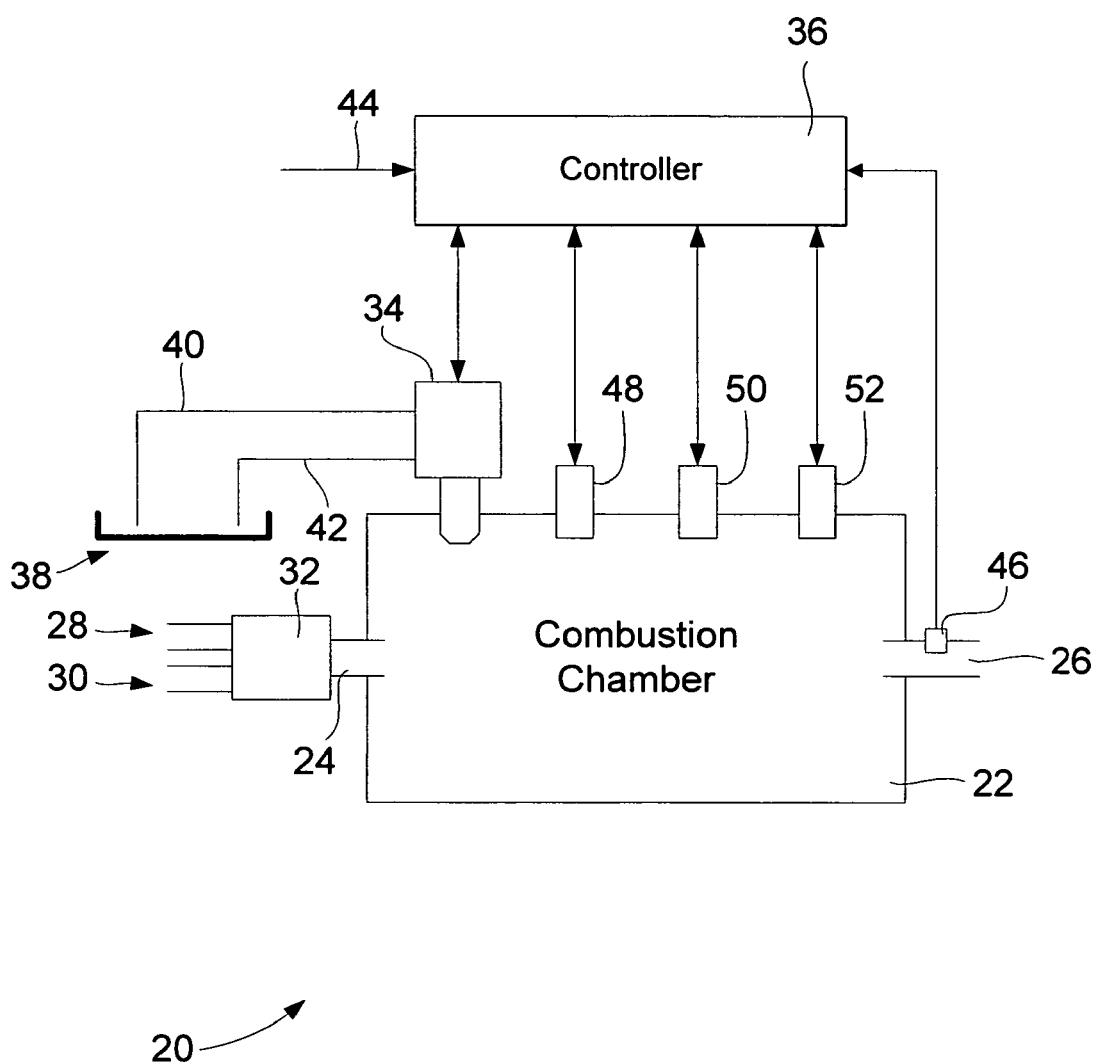
FIG. 1 is a block diagram generally illustrating a system in which the present invention operates.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The present invention provides a control system that controls the amount and timing of pilot fuel injection to obtain minimum NO$_x$ and UHC emissions. The control system senses if combustion occurs, when combustion occurs, and/or the quality of combustion in the combustion chamber of each cylinder of the gaseous fuel engine and adjusts the amount and/or timing of the pilot fuel injected. Thus, the control system allows engine performance to be continually optimized to obtain the minimum $NO_x$ and UHC emissions while at the highest efficiency possible irrespective of environmental changes, fuel quality, and cylinder-to-cylinder variations.

Turning to the drawings, wherein like reference numerals refer to like elements, the invention is illustrated as being implemented in a suitable combustion engine environment. The engine environment 20 has a plurality of combustion chambers (i.e., cylinders) 22, only one of which is illustrated. The combustion chamber 22 has an inlet passage 24 for the primary fuel/air mixture and an outlet passage 26 for exhaust. The primary fuel/air mixture is supplied to inlet passage 24 via manifolds 28 and 30. Air may be supplied to manifold 30 through natural aspiration, a turbocharger, supercharger, etc. Some systems have a mixing chamber or pre-combustion chamber 32 to mix and/or heat the primary fuel/air mixture.

At least one pilot fuel injector 34 supplies pilot fuel to the combustion chamber 22 and is controlled by controller 36. The pilot fuel injector 34 can be any electronically controlled fuel injector such as an electro-hydraulic fuel injector and the like. In the illustrated embodiment, the pilot fuel injector 34 is fed with diesel fuel or the like from a conventional tank 38 via a supply line or common rail 40. Typically diesel fuel is used as the pilot fuel. Other forms of pilot fuel can also be used. For example, new or used engine oil can be used as the pilot fuel as well as other fuels that initiate combustion by compression ignition. In some embodiments, the diesel fuel is supplied to the electronic injectors from a high pressure common rail. A return line 42 may run from the pilot fuel injector 34 to the tank 38.

The controller 36 comprises any electronic device that is capable of monitoring engine parameters and controlling the supply of pilot fuel to the combustion chambers 22. It may be a microprocessor, an EEPROM, an EPROM, an ASIC, and the like. The controller 36 may be part of the main fuel controller or a separate device. The air/fuel ratio control is well known and need not be discussed herein. During operation, the controller 36 commands limited amounts of pilot fuel into the combustion chamber in the presence of the primary gaseous fuel/air mixture in the combustion chamber. The pilot fuel ignites upon injection by compression ignition and burns at a high enough temperature to ignite the gaseous fuel charge.

Controller 36 receives signals that are indicative of various engine operating conditions including engine speed, fuel temperature, air temperature, knock level, exhaust gas oxygen (EGO) concentration level, and gaseous fuel composition via sensors (not shown), which are schematically illustrated in FIG. 1 as inputs 44, 46. Detection of combustion is accomplished using an ionization signal from a spark plug 48 or ionization probe 50 or through a cylinder pressure sensor 52. Although the three components 48, 50, 52 are shown in FIG. 1, it is recognized that only one component is needed to detect when combustion occurs. The present invention may eliminate the need for a spark plug 48, but the spark plug 48 may be used to aid in starting the engine. Other signals may be transmitted to controller 36 via other sensors as required. Controller 36 receives these signals and transmits output signals for controlling the pilot fuel injector 34.

Figure 2:
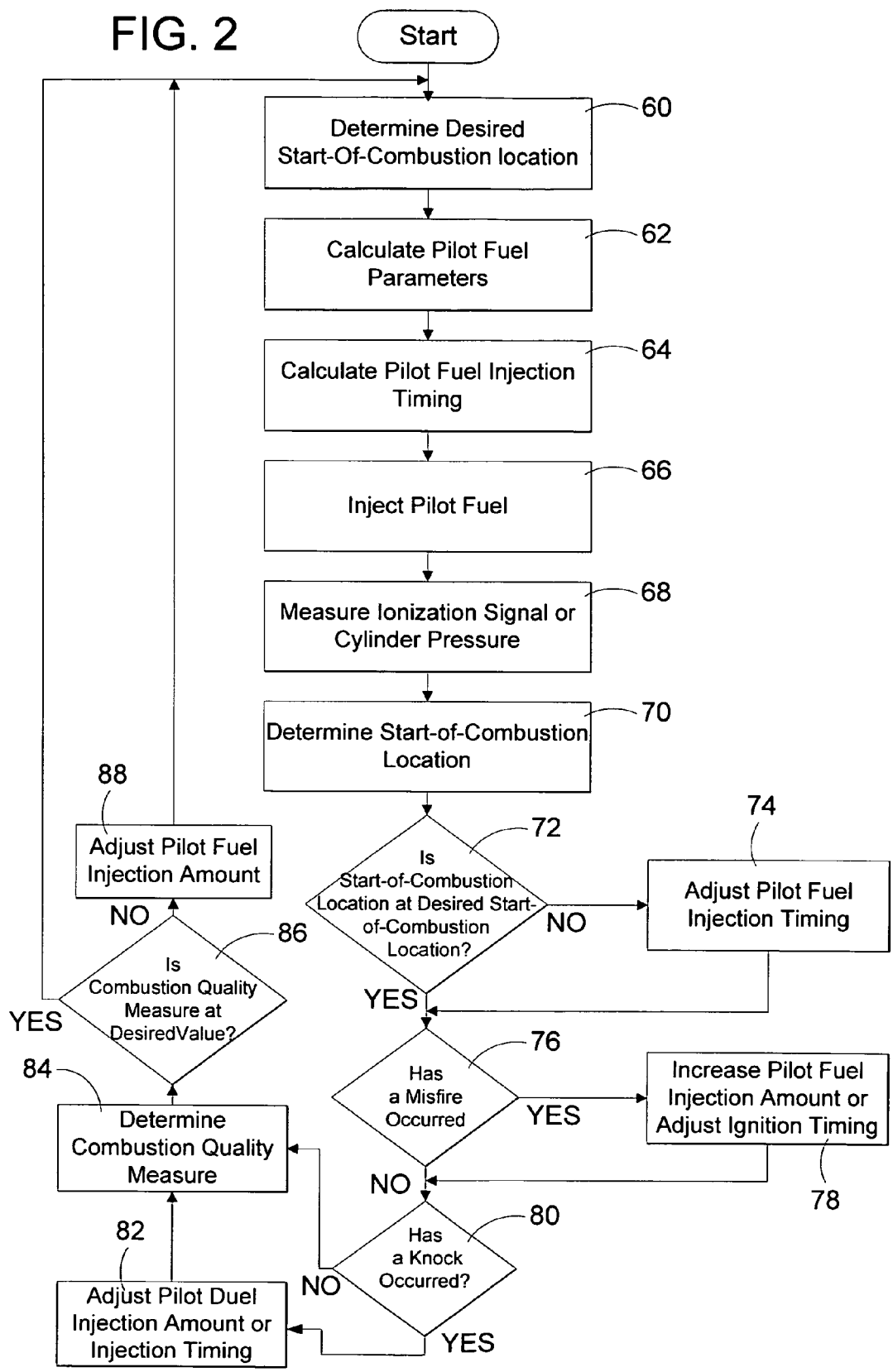
FIG. 2 is a flow chart illustrating a process performed by the controller of FIG. 1 for minimizing NO$_x$ and UHC emissions in the system of FIG. 1.

Turning now to FIG. 2, the steps the controller 36 performs are illustrated. While the steps are shown sequentially and serially, it is recognized that many steps may be performed in parallel or in different order than shown. In the description that follows, the operation of the present invention will be described with respect to a single combustion chamber 22. It is recognized that the controller 36 may perform the procedure on other combustion chambers in the engine environment 20 to compensate for chamber to chamber differences in air flow, residual exhaust gas, etc. and to compensate for fuel quality, temperature, and humidity. The controller 36 determines the desired start-of-combustion location based upon the engine parameters (step 60). Pilot fuel parameters are calculated (step 62). The required amount of fuel varies depending on the combustion chamber design, the fuel temperature, the air temperature, the air humidity, the air/fuel ratio in the chamber 22, the residual exhaust in the combustion chamber 22, the pilot fuel ignition characteristics (e.g., diesel fuel cetane number), and the pilot fuel spray characteristics. In one embodiment, the minimum amount is determined using a reference table (e.g., a look-up table) stored in the controller 36. Alternatively, the amount of pilot fuel is calculated based on combustion quality measurements.

The pilot fuel injection timing is determined (step 64). The injection timing is the time that the pilot fuel is injected in the combustion cycle. The determination of the injection timing takes into account the fact that fuels having relatively high air/fuel ratios (e.g., lean burning fuels) are harder to ignite and burn slower than fuels which have low air/fuel ratios. As a result, these fuels may require higher quantities of pilot fuel for optimum ignition and also may require that the timing of pilot fuel injection be advanced. Earlier injection is also required at high engine speeds to compensate for the time delay of the combustion event. Injection timing is retarded as knock levels increase and advanced as exhaust gas oxygen concentration levels increase. The minimum amount of pilot fuel required is injected at the calculated time (step 66).

The ionization signal or cylinder pressure is measured. Cylinder pressure sensors are well known to those skilled in the art. The ionization signal measurements can be obtained from an existing spark plug by applying a small voltage across the spark plug and measuring the current flowing through the spark plug. The current provides a direct indication of the start of combustion. In systems having no spark plugs, an ionization probe or sensor may be used. A voltage is applied to the ionization sensor prior to combustion. During the combustion, a small current flows through the combustion chamber 22 to engine ground. The current provides a direct indication of the start of combustion. Further details of an ionization probe can be found in SAE technical paper 1999-01-0549 titled "Closed Loop Start of Combustion Control Utilizing Ionization Sensing in a Diesel Engine," hereby incorporated by reference in its entirety.

The start of combustion location is determined from the cylinder pressure sensor or the ionization signal (step 70). The start of combustion location is compared to the desired start of combustion location (step 72). If the start of combustion location is not at the desired start of combustion location, the pilot fuel injection timing is adjusted (step 74). The controller 36 determines if a misfire has occurred (i.e., no combustion has occurred) (step 76). Detection of the misfire is based on either the measured cylinder pressure or the ionization signal. If a misfire has occurred, there is either not enough pilot fuel to cause ignition or the pilot fuel injection timing is incorrect. As a result, the pilot fuel injection amount is increased and/or the pilot fuel injection timing is adjusted (step 78). The controller also determines if a knock has occurred (step 80). Conventional knock sensors may be used. If a knock has occurred, the pilot fuel injection amount is increased and/or the pilot fuel injection timing is adjusted (step 82). Further details of sensing misfire and knock using an ionization signal can be found in U.S. patent application Ser. No. 10/286,353, entitled "Method And Apparatus For Detecting Abnormal Combustion Conditions In Lean Burn Reciprocating Engines", and assigned to the same assignee, the entire disclosure of which is hereby incorporated by reference in its entirety.

A combustion quality measure is determined (step 84). Combustion quality is an indication of the completeness of the combustion of the gaseous fuel. A high combustion quality, in terms of an as complete as possible combustion of the burning gases, is important for a low emission level. Combustion quality depends on the combustion chamber temperature, the turbulence of the burning gases, residence time and the oxygen excess. These parameters are governed by the combustion chamber design, combustion settings (e.g. air/fuel ratio, distribution of the air nozzles, etc.) load condition (full-or part-load), and fuel characteristics. In one implementation, an exhaust gas oxygen sensor is used to determine combustion quality. Combustion quality may also be determined from a cylinder pressure measurement.

The combustion quality measure is compared to a desired combustion quality value (step 86). If the combustion quality measure is not at a desired combustion quality value (i.e., is not approximately equal to the value), the pilot fuel injection amount is adjusted (step 88). Steps 60–88 are repeated for each cycle of the combustion chamber 22.

The present invention controls the minimum amount of pilot fuel injected that initiates combustion consistently without a misfire at the correct timing for each chamber based on cylinder pressure or ionization signal measurements has been described. This results in the lowest possible $NO_x$ and UHC emissions by compensating for changes in operating conditions and operating just short of misfire.

The foregoing description of various embodiments of the invention has been presented for purposes of illustration and description. It is not intended to be exhaustive or to limit the invention to the precise embodiments disclosed. Numerous modifications or variations are possible in light of the above teachings. For example, the comparison of parameters to desired values (e.g., combustion quality measure) may be compared to a tolerance range of the desired values (i.e., a window comparator). The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method to minimize NOx and UHC emissions in a pilot fuel ignited gaseous fuel engine comprising the steps:
   determining a minimum amount of pilot fuel needed to ignite gaseous fuel in a combustion chamber;
   injecting the pilot fuel into at least one of a prechamber and the combustion chamber;
   determining a start of combustion location from one of an ionization signal and a cylinder pressure of the combustion chamber;
   comparing the start of combustion location to a desired start of combustion location; and
   adjusting a pilot fuel injection timing if the start of combustion location is not approximately equal to the desired start of combustion location.

2. The method of claim 1 further comprising the step of measuring at least one of the ionization signal and the cylinder pressure of the combustion chamber.

3. The method of claim 1 wherein the pilot fuel is one of diesel fuel and engine oil.

4. The method of claim 1 further comprising the step of determining the desired start of combustion location.

5. The method of claim 1 further comprising the step of determining a pilot fuel injection timing.

6. The method of claim 5 wherein the step of determining the pilot fuel injection timing comprises determining the pilot fuel injection timing as a function of air/fuel ratio, engine speed, knock level, and exhaust gas oxygen concentration level.

7. The method of claim 1 further comprising the step of measuring the one of the ionization signal and the cylinder pressure.

8. The method of claim 1 further comprising the step of adjusting one of the pilot fuel amount and a pilot fuel injection timing if a misfire has occurred.

9. The method of claim 1 further comprising the step of adjusting one of the pilot fuel amount and a pilot fuel injection timing if a knock has occurred.

10. The method of claim 1 further comprising the steps of:
    comparing a combustion quality measure to a desired value; and
    adjusting the pilot fuel amount if the combustion quality measure is not approximately equal to the desired value.

11. A pilot fuel injection system controller comprising:
    means for determining a minimum amount of pilot fuel needed to initiate combustion of gaseous fuel in a combustion chamber;
    means for controlling a pilot fuel injector to inject the pilot fuel into at least one of a prechamber and the combustion chamber;
    means for determining a start of combustion location from one of an ionization signal and a cylinder pressure;
    means for comparing the start of combustion location to a desired start of combustion location; and
    means for adjusting a pilot fuel injection timing if the start of combustion location is not approximately equal to the desired start of combustion location.

12. The pilot fuel injection system controller of claim 11 further comprising means for adjusting at least one of the pilot fuel amount and a pilot fuel injection timing if at least one of a knock has occurred and a misfire has occurred.

13. The pilot fuel injection system controller of claim 11 further comprising means for comparing a combustion quality measure to a desired value and adjusting the pilot fuel amount if the combustion quality measure is not approximately equal to the desired value.

14. A natural gas combustion engine comprising:
    at least one cylinder having a combustion chamber;
    a pilot fuel injector system comprising;
    a pilot fuel injector in communication with the combustion chamber;

a controller for controlling the pilot fuel injector to minimize NOx and UHC emissions, the controller including means for determining a minimum amount of pilot fuel needed to initiate combustion of gaseous fuel in a combustion chamber;

means for controlling a pilot fuel injector to inject the pilot fuel into at least one of a prechamber and the combustion chamber;

means for determining a start of combustion location from one of an ionization signal and a cylinder pressure;

means for comparing the start of combustion location to a desired start of combustion location; and means for adjusting a pilot fuel injection timing if the start of combustion location is not approximately equal to the desired start of combustion location.

15. The natural gas combustion engine of claim 14 wherein the controller further comprises means for adjusting the pilot fuel amount if at least one of a knock has occurred and a misfire has occurred.

16. The natural gas combustion engine of claim 14 wherein the controller further comprises means for adjusting a pilot fuel injection timing if at least one of a knock has occurred and a misfire has occurred.

17. The natural gas combustion engine of claim 14 wherein the controller further comprises means for adjusting the pilot fuel amount if the combustion quality measure is not approximately equal to a desired combustion quality.

* * * * *